United States Patent [19]

Saldin et al.

[11] Patent Number: 4,665,501

[45] Date of Patent: May 12, 1987

[54] WORKSTATION FOR LOCAL AND REMOTE DATA PROCESSING

[75] Inventors: Neil P. Saldin, Dix Hills; Bruce J. Strum, Commack; Michael V. Livoti, Islip Terrace; Allan Maurer, Fort Salonga, all of N.Y.

[73] Assignee: Esprit Systems, Inc., Melville, N.Y.

[21] Appl. No.: 537,637

[22] Filed: Sep. 30, 1983

[51] Int. Cl.⁴ .............................................. G06F 15/62
[52] U.S. Cl. .................................... 364/900; 364/518; 364/521; 340/717; 340/721; 340/711
[58] Field of Search ... 364/200 MS File, 900 MS File, 364/521; 340/720, 711, 721

[56] References Cited

U.S. PATENT DOCUMENTS

| | | | |
|---|---|---|---|
| 4,079,449 | 3/1978 | Mercurio | 364/200 |
| 4,232,370 | 11/1980 | Tapley | 364/900 |
| 4,394,649 | 7/1983 | Suchoff | 340/721 |
| 4,434,460 | 2/1984 | Drakenborn | 364/900 |
| 4,587,633 | 5/1986 | Wang et al. | 364/521 |

OTHER PUBLICATIONS

"Enhanced Terminal Console Operator's Handbook", Revision 1.1 Dec. 1982, pp. 1–50, Hazeltine Corporation, 500 Commack Road, Commack, N.Y. 11725.
"Companion" pp. 1–7, AMDA Computer System, Inc., 2629 North Scottsdale Road, Scottsdale, Ariz. 85257.
"TC 1000 Terminal Converter", 1982 3R Computers, Inc., Westboro, Ma. 01581.

Primary Examiner—Archie E. Williams
Assistant Examiner—Emily Yue Chan
Attorney, Agent, or Firm—Brumbaugh, Graves, Donohue & Raymond

[57] ABSTRACT

A computer workstation includes a display monitor and keyboard that can be used as a smart terminal for remote data processing in a first operating mode and that can be used as part of a microcomputer in a second operating mode. To provide maximum software compatibility separate display generators are provided, one for each operating mode. A network operating mode can also be provided.

4 Claims, 5 Drawing Figures

WORKSTATION FOR LOCAL AND REMOTE DATA PROCESSING

BACKGROUND OF THE INVENTION

This invention to computer workstation equipment, and particularly to a computer workstation which can be operated as either a smart computer terminal for remote data processing, as a stand-alone microcomputer, or as a networked microcomputer workstation.

It is well known in the prior art to use the computer terminals which are connected by communications links to a central processing unit. Modern terminals called "smart terminals" include microprocessor control circuits with firmware that can provide a special terminal editing features, for data formatting and presentation. Such "smart" terminals do not, however, have the capability to provide local data processing other than such editing, formatting and presentation features. Many "smart" terminals not only provide their own set of such features, but are also designed to "emulate" such features which are available in other, similar terminals. Accordingly, such terminals can be used with central computers and programs designed to be used with other, similar terminals. The assignee of this application presently markets such "smart" terminals, including one having the tradename "Esprit II". Smart terminals are generally used for what is referred to herein as "remote data processing", which means that data processing and manipulation takes place in a unit of equipment remote from the terminal.

FIG. 1 illustrates in block diagram a typical configuration for use of smart terminals for remote data processing. A central processing unit (CPU) 10 is provided with a storage device 12, such as a hard disk storage unit and a printer 14 to provide hard copy output. Smart terminals 16 are connected to the central processing unit 10 by communication lines in various topologies. The terminals 16 may be used by computer operating employees for purposes of entering, processing, and retrieving data from the central processing unit 10 and its related peripheral devices, such as storage unit 12. In a typical application, an operator at a terminal 16 may communicate with the central processing unit 10 in order to obtain information from storage unit 12, for example, the availability of seating on an airline flight. The operator at a terminal 16 may also enter data representing, for example, an airline reservation made by a prospective passenger. The operator at terminal 16 may also have some of the information printed out on a printer 14, for example, a print-out of an airline ticket for the potential passenger. In the configuration of FIG. 1 substantially all of the data processing and manipulation takes place in the central processing unit 10, which has access to mass storage unit 12 and printer 14. It is possible, in some situations, to have printers also associated with terminal 16.

FIG. 2 illustrates the configuration in block diagram form of a typical smart terminal 16 of the type useful in the computer configuration of FIG. 1. The configuration of FIG. 2 includes a display monitor 18, which usually includes a cathode ray tube display on which alphanumeric characters are presented to the terminal operator. There is also provided a communications interface 20 for placing data into correct format for transmission to the central processing unit 10 and for receiving data from the central processing unit 10. A keyboard 22 is provided for manual entry of data, including inquiries, by the terminal operator. A display memory 24 is provided for storing the alphanumeric characters presented on the display 18. This display memory is also known as a refresh memory. The terminal is operated by the display control circuitry 26, which is well known in the art. Typically, such display control circuitry 26 might include a microprocessor operating under a "firmware" control program in a read-only memory for receiving and operating on data received from the keyboard 22 and the communication interface 20. The firmware control program may enable the smart terminal to assume a variety of display function characteristics to emulate a variety of terminals. The display control circuitry also includes circuitry known as the CRT controller, which addresses data in the display memory and provides timing signals to the character generator for generating a suitable video signal. The CRT controller also generates suitable control signals, such as horizontal and vertical synchronization signals, which are supplied to the cathode ray tube display monitor 18.

There have become known in the prior art small, self-contained computer systems, which are frequently referred to as microcomputers, with a central processing unit which is a microprocessor. Such microcomputers are generally equipped with a keyboard, a local memory and a display. According to the configuration of the microcomputer, the local memory may include a memory portion for refreshing the display, or there may be included two local memories, one for providing the display memory function, typical of a terminal, and the other for providing program memory for program information and data. Such microcomputers usually include display control circuitry which is closely associated with and operated by the central processing unit of the microcomputer. The display control circuitry would typically include its own CRT controller circuit for generating the necessary CRT control signals and timing signals for generation of the video signal, but usually does not include a separate microprocessor of the type used in the terminal 16 for purposes of controlling data flow into and out of the display memory and for processing of control signal for the display. In a microcomputer these control functions are usually performed by the central processing unit of the microcomputer.

It has been known to make use of networked microcomputers for purposes of economy in a configuration which has become known as a distributed data processing system. FIG. 3 illustrates a typical distributed data processing configuration wherein a plurality of microcomputers 28, each with its own central processing unit, keyboard 30, memory 32 and display 34 are connected by communication lines to a centralized central processing unit 10. In some configurations of this type, central processing unit 10 may also be supplied with a keyboard, a memory, and a display device so that it can also act as a workstation, similar to the work stations formed by microcomputers 28. The central processing unit 10 is provided with direct access to mass storage, such as disk storage 12, and also to a printer 14. An operator using one of workstations 28 will typically access a program or set of data contained in storage unit 12, which will be down-loaded by central processing unit 10 to the microcomputer 28 which the operator is using. Thereafter, the microcomputer unit 28 acts as an independent processor working under the down-loaded program, substantially independent of the central processing unit 10, except possibly for supplying data to update information in storage unit 12. A typical example of this type of data processing network would be a word processing system wherein a word processing program is down-loaded by central processing unit 10 to microcomputer 28. The operator at microcomputer 28 can perform word processing operations to enter or edit data which is contained in its local memory 32. When it becomes necessary to print out the data, it can be transmitted back to central processing unit 10 for operation of printer 14. The microcomputer network configuration of FIG. 3 represents what will be referred to herein as distributed processing, wherein substantial data processing functions, including a control program, are operated in the individual workstations comprising microcomputers 28.

An object of the present invention is to provide a workstation, which can be used either as a smart terminal 16, for performing remote data processing, as a stand-alone microcomputer for performing local data processing, or as a networked microcomputer 28 for performing local data processing. It is possible to achieve this functional result to a limited extent by providing a special program for a microcomputer 28 which causes the microcomputer to simulate the operation of a smart terminal 16 and thereby perform the input and output data functions in connection with remote processing of data which can be performed with a smart terminal. This approach is not entirely satisfactory because the arrangement of the display controller in a microcomputer often does not provide all of the operating characteristics which can be provided with a smart terminal.

Further, it is very difficult to provide a microcomputer program which will enable the microcomputer to emulate the functional characteristics of a variety of smart terminals as is done with available smart terminals, which include hardware and firmware specifically designed for such emulation. In addition, the keyboard of a microcomputer may not have a sufficient number of control key functions to provide the operational features which are provided in a smart terminal. Some of the special operational features available in a smart terminal under software or operator control, which would be extremely difficult to implement using software in a microcomputer are display of double-height, double-width characters and smooth scrolling of the displayed message.

It is generally possible to use a smart terminal serially connected to the central processing unit of a microcomputer using the microcomputer as the remote processing device and having the display function performed by the smart terminal. This approach does not work effectively with third party application software which may be available for the microcomputer, which assumes that the microcomputer is operating in connection with its own CRT display controller, which is directly coupled to the central processing unit or microprocessor of the microcomputer. Accordingly, modification of the microcomputer software is necessary to achieve operation of the microcomputer serially connected to a smart terminal, and the full performance capabilities of the microcomputer could not be achieved due to the serial connection.

It is therefore an object of the present invention to provide a multi-mode workstation, which is capable of operating with a remote data processing unit under control of programs in the remote data processing unit intended for use with smart terminals, and which is also capable of providing stand-alone local microcomputer processing using standard control programs intended for use in connection with similar microcomputers, or networked microcomputer processing using standard or custom developed network software.

SUMMARY OF THE INVENTION

In accordance with the invention, there is provided a workstation for performing both local and remote data processing. The workstation includes a display unit having a first display memory, a first display control circuit, a display monitor, a data communications port and a first keyboard input port and the display unit is responsive to data representative signals supplied to the data communications port and the keyboard input port for storing displayable data in the first display memory. The first display control circuit is responsive to the data in the first display memory for generating first display signals with selected signal format. There is also provided a computer unit, including a central processing unit, a second display memory, a second display control circuit, a second keyboard input port, at least first and second data communications ports, a keyboard data output port and a control program for controlling the central processing unit. The keyboard data output port is connected to the first keyboard data input port of the display unit. The first data communications port is connected to the data communications port of the display unit. The control program includes a terminal control mode program for operating the central processing unit to couple data supplied to the second keyboard input port to the keyboard output port with data format at the keyboard output port suitable for the display unit first keyboard input port and to couple data between the first and second data communications ports with data format at the first data communication port suitable for the display unit data communications port. The control program includes a local display program for causing the central processing unit to supply data to the second display memory and to cause the second display control circuit to respond to data in the second display memory for generating second display signals with the selected signal format. Finally, there is provided a display signal switch for supplying the first display signals to the display monitor when the central processing unit operates under the terminal mode control program and for supplying the second display signals to the display monitor when the central processing unit operates under the local display program.

For a better understanding of the present invention, together with other and further objects, reference is made to the following description, taken in conjunction with the accompanying drawings, and its scope will be pointed out in the appended claims.

DESCRIPTION OF THE INVENTION

Figure 4:
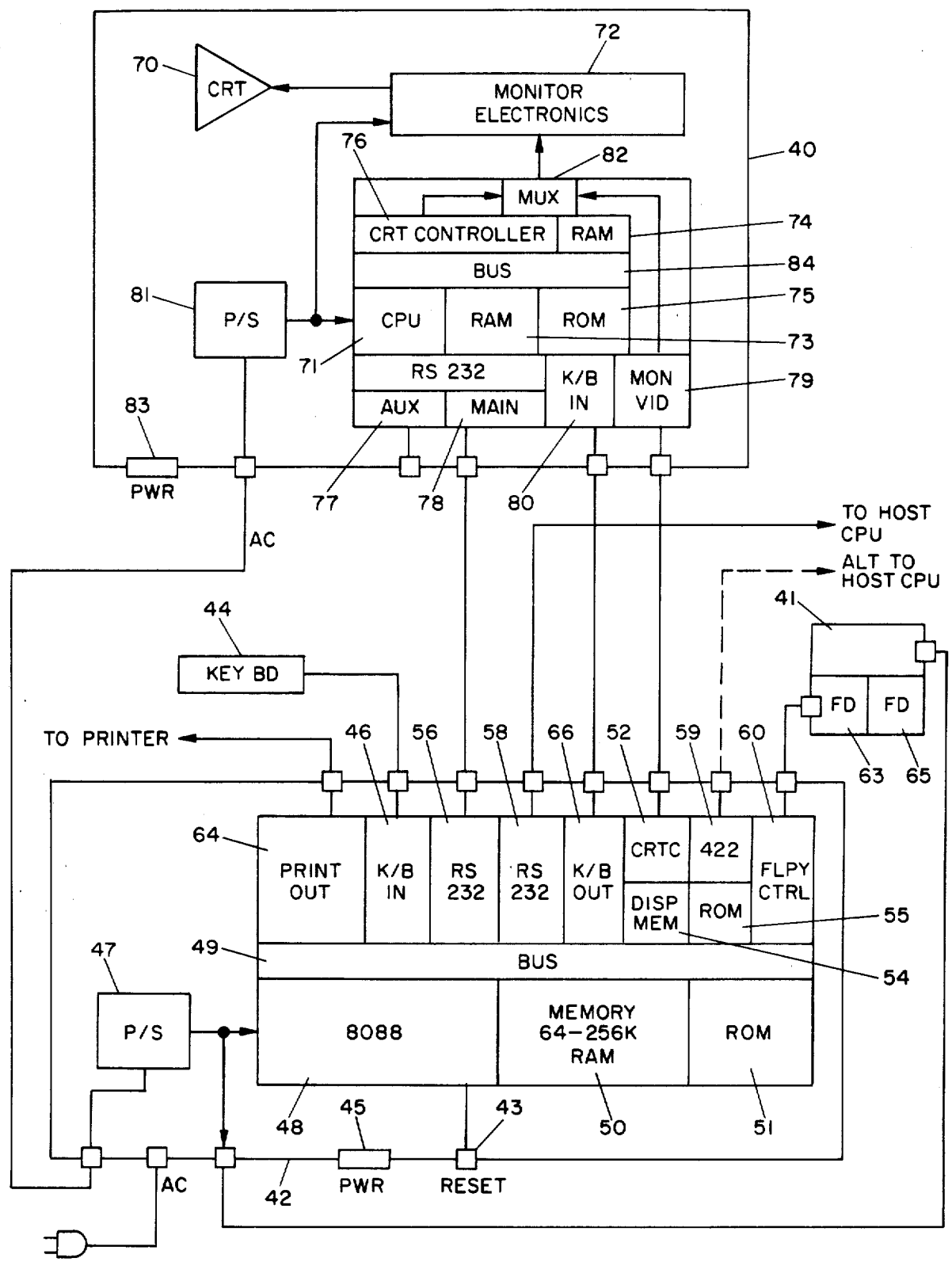
FIG. 4 is a block diagram illustrating a workstation in accordance with the present invention.

FIG. 4 illustrates a workstation for both local and remote data processing in accordance with the present invention. The workstation includes three principal workstation portions, which may be in separate cabinets, or alternately may be incorporated into a single cabinet or chassis. The components of the system have principal portions designed along the lines of prior art components, as will be described, to insure software and hardware compatibility with previously existing components which perform similar functions.

The three principal portions of the workstation illustrated in FIG. 4 are the display unit 40, the computer unit 42, and the keyboard unit 44. The display unit 40 is similar in design to portions of existing smart computer terminals, such as the Esprit II terminal which is marketed by the assignee of the present invention. The computer unit 42 uses a single circuit board microcomputer, in the illustrated example, a Faraday Electronics Model 64 unit which includes an Intel 8088 microprocessor 48, a 128 K random access memory (RAM) 50, a keyboard input 46, serial input/output ports 56 and 58, internal bussing 49 and firmware in read-only memory (ROM) 51. The keyboard unit 44 is a unit compatible with the computer unit 42, but having additional key notations, as will be described.

Computer unit 42 includes a keyboard input 46 which operates to receive input data from keyboard 44. The input data is supplied to a central processing unit, 48 which operates in conjunction with a processing memory 50 and/or ROM 51, which may contain both programs and data. Typically, memory 50 may have the capacity of 64 to 256 kilobytes. Central processing unit 48 is a microprocessor-based central processing unit, such as the 8088 illustrated, which interfaces with RAM 50, ROM 51, keyboard input 46 and other devices as will be described. ROM 51 includes basic initializing programs and control programs as required for standalone computer operation and other programs for implementing terminal-mode or network mode operation.

Computer unit 42 includes display control circuits 52 which are provided as part of the microcomputer system to operate in conjunction with central processing unit 48 for purposes of providing a CRT display in conjunction with computer operations. The display control circuits 52 respond to data in a display memory 54 which is a random access memory. Computer 42 responds to a local display operating program, which may be in a portion of ROM 51, which causes the central processing unit 48 to control the operation of the display control circuit 52. Such control may be implemented, for example, to control the cursor position as data is entered from the keyboard, and to place the data from the keyboard in the proper position in the display memory 54. Other functions relating to the operation of the display control circuitry may also be performed by the central processing unit 48 in a manner similar to the operation of microprocessors that are often provided in connection with smart display terminals. Accordingly, it may be seen that the micromputer 42 has display control circuitry which is intimately connected to the central processing unit 48, and generally controlled by operation of the central processing unit 48, rather than by operation of a separate microprocessor.

Computer 42 includes at least two serial input/output ports 56 and 58. These ports are configured to transfer data to and from other units, and in the configuration illustrated in accordance with the invention, the first input/output port 56 is connected to the main input/output port 78 on the display unit 40. The second input/output port 58 is connected to a host computer, when the system is operated as a remote terminal. Input/output ports 56 and 58 are standard RS-232C EIA interfaces. An additional, high data rate port 59, which is an RS-422 EIA interface may be optionally provided for high speed data transfer if the workstation is to be used as part of a distributed processing network as in FIG. 3.

Computer unit 42 may optionally include a floppy disk controller unit 60 for interfacing with a local floppy disk unit 41, and includes a parallel bi-directional port 64 suitable for operating a local printer. If a local floppy disk unit 41 and optionally a local printer are provided, it is possible to operate computer unit 42 with display unit 40 and keyboard 44 as an entirely independent local processing unit without connection to a host central processing unit. In this case, programs and data can be loaded by use of the floppy disk unit 41.

The keyboard interface 46 of the computer unit 42 is designed to operate with a particular type of keyboard used with the microcomputer system. For example, in the above-mentioned microcomputer, the keyboard 44 includes a microprocessor which provides the interface 46 with data representing key strokes. The central processing unit 48, interprets the keystroke information from interface 46 and generates an appropriate piece of data for use by the central processing unit 48.

The computer unit 42 of the present invention includes a serial data converter 66 which is usually not provided in a microcomputer system, but is provided in the configuration illustrated in FIG. 4 for purposes of the present invention, as will be further described.

Those skilled in the art will recognize that the computer unit 42, as it is conventionally configured, may include a display monitor which responds to the output of the display control circuitry 52. The display monitor is not provided in the workstation of the present invention since the display circuitry 52 of the computer unit 42 provides a display signal, including video, intensity, horizontal and vertical synchronizing signals, to the display unit 40 for display monitor 72 provided therein.

Those skilled in the art will recognize that there is no particular standard for the format of video, intensity, horizontal and vertical synchronizing signals for CRT display in connection with microcomputer operations. An important aspect of the present invention is the fact that the computer unit 42 has a specially designed display control unit 52 which is compatible with the operation of the display monitor 72 included within the display unit 40. This compatibility involves the same vertical refresh rate and the same horizontal line rate as used within unit 40. Accordingly, the display signals provided by the display control circuitry 52 will be suitable to operate the display monitor 72 in the display unit 40. In providing such compatibility, care must be taken that the display control circuit 52 is arranged to be compatible in hardware and software with the interface characteristics of central processing unit 48, so that the computer unit 42 will be fully compatible with available software for similar 8088 based microcomputers, including the software which controls the display. A portion of such software is a variation of the Basic Input Output Software (BIOS) available with the Faraday computer board and contained in ROM 51. In addition, ROM 51 contains firmware for control of CRT controller 52. The system will operate with a standard operating system, such as the Microsoft MS-DOS Version 2.0, which can be locally booted from floppy disk unit 41 using boot firmware in ROM 51. Alternately, an operating system can be down-loaded from a host computer in a networked local data processing mode. Accordingly, the computer unit 42 can be used with software provided for similar computer units that are not interconnected to the display unit 40, but provided with their own display, operating under the control of a display control circuit similar to circuit 52. The required horizontal and vertical synchronization rates are achieved by a selection of an appropriate display clock and counting circuits, and by programming of a CRT controller chip, such as The Motorola MC 6845, to achieve the compatibility required for operation with display unit 40. The display control circuitry includes a data bus 20 which interfaces with the display memory 54 and is connectable to data and address bus 49 of the central processing unit 48 for transfer of data. This display data bus is also connected to a serial data converter unit 66 which may be a National Semiconductor INS 8250 Asynchronous Communications Element, for providing data to the keyboard input 80 of display unit 40 from the display data bus in a format compatible with the expected keyboard input for the display unit 40.

In the illustrated configuration, a floppy disk unit 41 housing floppy disk drives 63 and 65 is interfaced to the microcomputer through optional floppy disk controller 60, which uses a NEC uPD 765 floppy disk controller chip, available from NEC Microcomputers, Inc.

A parallel printer controller 64 is provided for local printing capability for the microcomputer. If it is desired to provide high speed communications to a host computer for down-loading programs or data in a distributed data processing network application a high speed input/output port 59 is available as an option.

Figure 1:
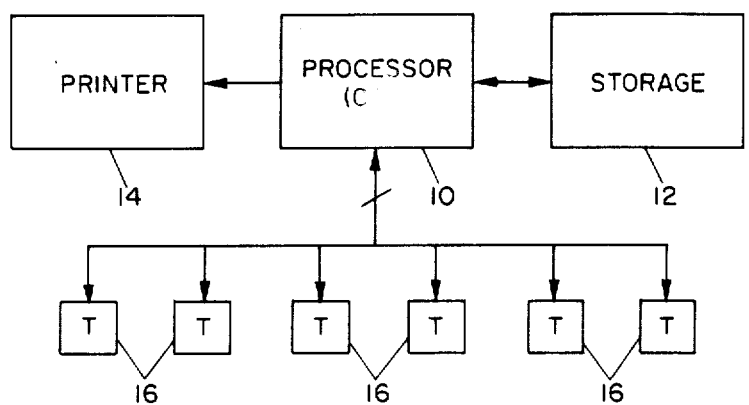
FIG. 1 is a block diagram illustrating a configuration for use of smart terminals for remote data processing.
Figure 2:
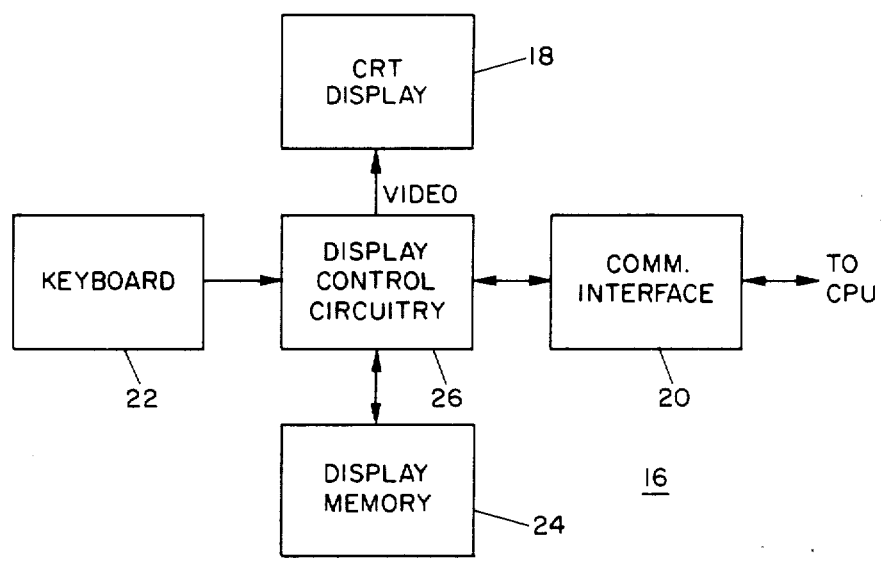
FIG. 2 is a block diagram illustrating principal portions of a smart terminal.

The display unit 40, as previously mentioned, includes many components which are common to conventional smart terminals of the type shown in FIG. 2. The display unit 40 includes a keyboard input 80, which in the conventional smart terminal responds to an encoded keyboard input, that is, to serial data generated upon the key stroke in an encoding keyboard. The display unit includes a display memory 74, which operates in conjunction with a CRT controller 76 for generating display signals, including video, intensity, vertical and horizontal synchronization signals for operating the display monitor consisting of CRT 70 and monitor electronics 72. The smart terminal usually includes a microprocessor 71 for management of display functions. Microprocessor 71 is coupled by address and data buses 84 to randomaccess memory (RAM) 73 and read-only memory (ROM) 75. These memories provide firmware programs and data storage for the microprocessor 71. The microprocessor is also coupled to main and auxiliary RS-232C EIA input/output ports 78 and 77, keyboard input port 80, CRT controller 76 and display RAM 74. Input/output port 78 operates with the microprocessor 71 to communicate with a host central data processing unit in a conventional remote processing configuration, shown in FIG. 1. Input/output port 77 is usually used for operation of a local serial printer.

If display unit 40 is provided with a keyboard connected to keyboard input 80, and connected to a host computer via input/output port 78, it will function identical to a smart terminal. Accordingly, the same hardware comprising display unit 40 can be used to form a smart terminal by supplying a keyboard, or can be used as part of the multimode workstation by connection to computer unit 42.

Included within the display unit 40, but not previously provided in such units, is a multiplexer switch 82 which selects either first display signals from the CRT controller 76 or second display signals from CRT controller 52 via a monitor video input connector 79 in the display unit 40. The multiplexer switch 82 is provided with a control signal from microprocessor 71 in the display unit 40 in response to software commands issued from the central processing unit 48 in the computer unit 42.

The input/output port 78, which is usually connected to a remote central data processing system for remote data processing is connected to the first input/output port 56 of the computer unit 42. Likewise, since no encoding keyboard is provided, keyboard input 80 is connected to the keyboard output port comprising serial data converter 66 in computer unit 42, which provides serial data representative of key strokes to the display unit 40. The keyboard 44 is of special design and includes the usual keys provided with a computer unit similar to computer unit 42, and additional key notations for providing function commands, similar to those provided in connection with a smart terminal of the type which would use the terminal portions of display unit 40.

The workstation illustrated in FIG. 4 has three modes of operation. The first mode of operation is as a remote data processing smart terminal. For this operation the ROM 51 of computer 42 is provided with a terminal mode control program. This program causes the central processing unit 48 to read keyboard input data provided at keyboard interface 46 from keyboard 44 and to convert the keyboard input data into a parallel data format which is encoded in a code compatible with the keyboard input 80 and the display control unit 76 of display unit 40. The keyboard data is provided in parallel form to the data bus in the display control circuitry 52 and thereby coupled as a parallel data input to the keyboard output port comprising parallel to serial data converter 66. Serial Data Converter 66 transmits the keyboard data in the expected serial data bit stream to the keyboard input unit 80 on display unit 40. Display unit 40 thereby receives the keyboard data as if it were directly connected to an encoding keyboard, but the encoding function is performed by the central processing unit 48 under the operation of the terminal mode control firmware program in ROM 51. As previously mentioned, data communications port 78 of display unit 40 is connected to data communications port 56 of computer unit 42. Accordingly, communications between display unit 40 and a host central processing unit for purposes of operating in the first terminal mode takes place through computer unit 42, which provides communications transparency between the display unit 40 and the host computer. Since the display generation in the remote data processing mode is performed by the CRT controller 76 in the display unit 40 operating under the control of microprocessor 71 and a firmware program in ROM 75, the display generation will be in a format fully compatible with software contained in the host central processing unit for operating an ordinary smart terminal.

As previously mentioned, the keyboard 44 is provided with additional functional keyboard notations to provide the full flexibility of keyboard input to the display unit 40 which is normally associated with a smart terminal. Key stroke encoding according to the format expected by display unit 40 is not performed in the keyboard, as is usually done in a smart terminal, but is performed by the central processing unit 48 of the computer 42. As perceived by the operator working keyboard 44 and as perceived by the host central processing unit operating under a remote data processing program, the workstation illustrated in FIG. 4 of the present invention has all the attributes and characteristics of a smart terminal, and is therefore fully compatible with software written for such terminals.

The second mode of operation for the workstation illustrated in FIG. 4 is for purposes of providing local data processing. After loading an operating system from local floppy disk unit 41, local data processing may be performed by manually entering a program into the computer unit 42 or by loading a program into the computer unit 42 by use of local floppy disk unit 41, connected to floppy disk controller 60. When the workstation is operated in the local processing mode, the multiplexer 82 connects the output of display control circuitry 52 in computer unit 42 to the display monitor 72. The display generated and displayed on CRT 70 is therefore originated as a video signal in computer unit 42. Accordingly, the display operation is entirely compatible with programming which has been written for computer units similar to the computer unit 42 having their own display monitor. Since the keyboard 44 is of the type usually used with available microcomputers similar to computer unit 42, the keyboard operations have the same interpretation. When operating in the local data processing mode, central processing unit 48 controls display control circuitry 52 to generate a display identical to the display provided by similar microcomputers using the same programming. Parallel to serial converter 66 and input/output communications port 56 are not used when operating in the local data processing mode.

Figure 3:
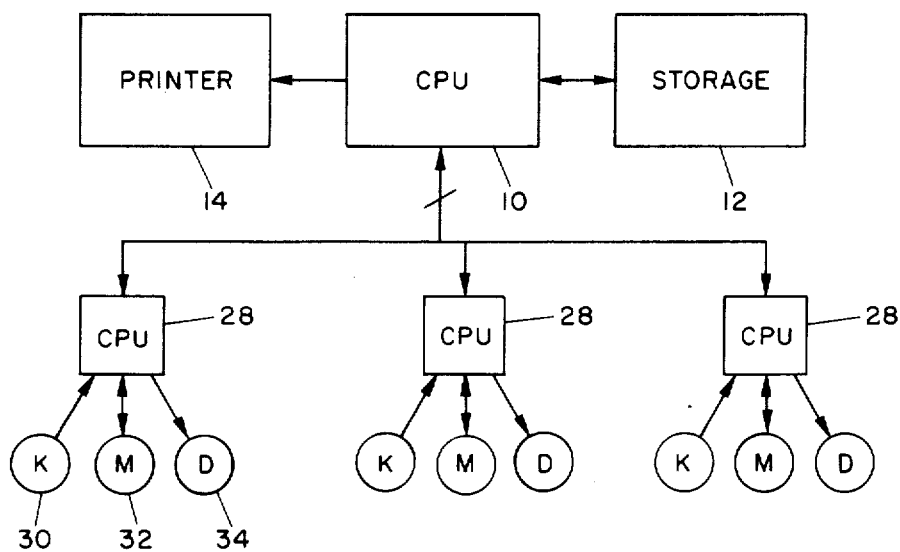
FIG. 3 is a block diagram illustrating a configuration for distributed data processing.

The third mode of operation for the workstation illustrated in FIG. 4 is the distributed data processing network mode. This mode is an optional feature on the workstation, and is provided by adding the high-speed input/output port 59 and optional ROM 55 incorporating a network mode initialization and control program. In the network operating mode, the microcomputer is linked to a host central processing unit, as illustrated in FIG. 3, preferably through port 59. Following initialization of the high-speed port 59, the host can "download" control programs or data for distributed data processing operations, such as word processing. This type of operation is very similar to the stand-alone local data processing mode, since usually the display signals will be generated by CRT controller 52. It is, however, possible that under this mode a command can be generated by the host or locally to cause CPU 48 to send a command to display unit 40 to switch the display monitor 72 to the CRT controller 76 in display unit 40. Thus, the display will respond to data relayed from port 56 to port 78. The keyboard will continue to provide inputs to CPU 48.

Figure 5:
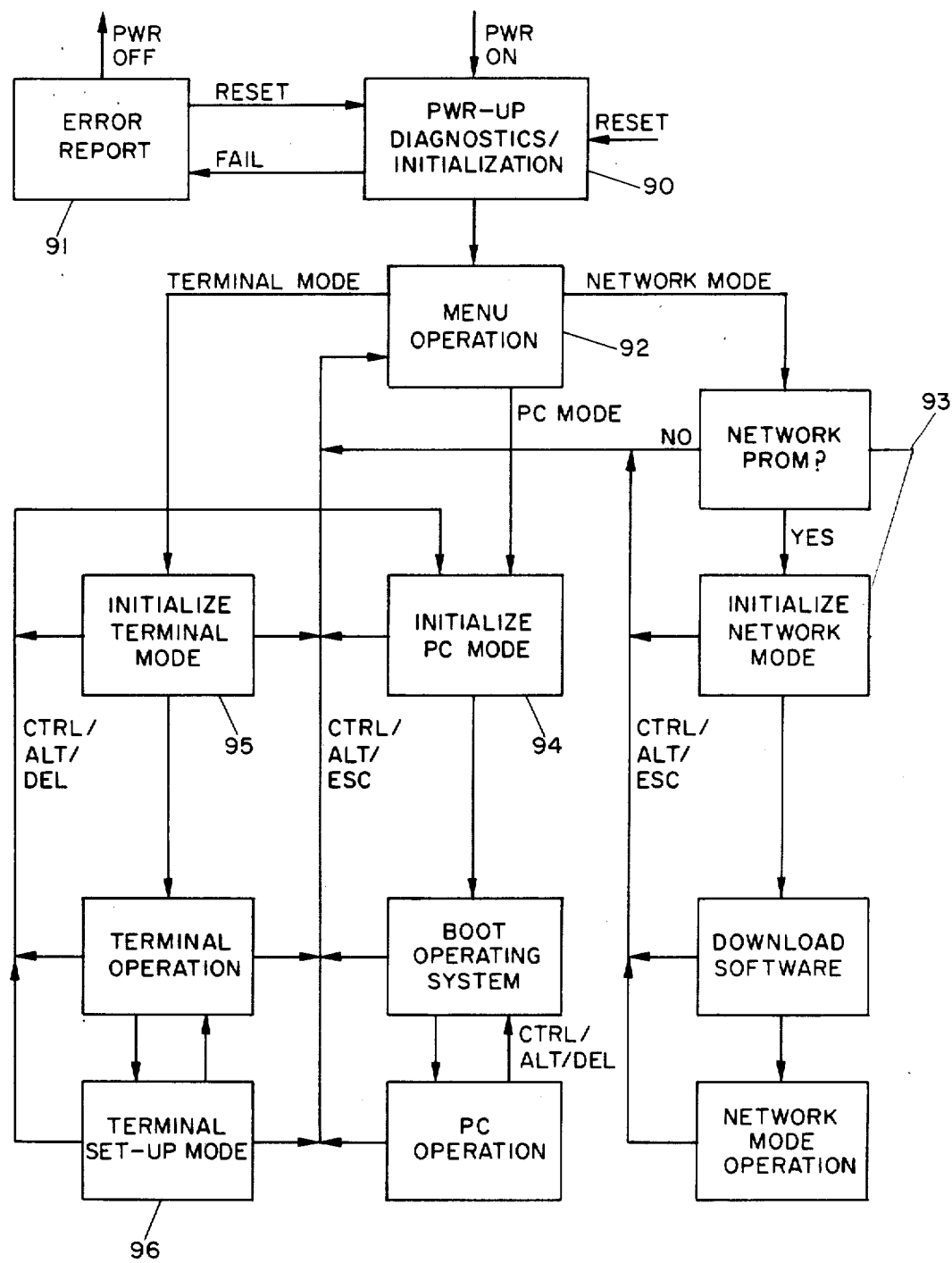
FIG. 5 is a flow diagram illustrating the operating functions of a workstation in accordance with the present invention.

FIG. 5 is an operational flow diagram illustrating the operation of the workstation of FIG. 4. Prior to turning on the system, the power switch 83 on display unit 40 should be in the "on" position. When power switch 45 on computer unit 42 is switched to the "on" position, AC power is supplied to power supply 81 in display unit 40 and power supply 47 in computer unit 42.

Referring to the flow diagram of FIG. 5, it can be seen that by switching power switch 45 to the "on" position a power up, diagnostic and initialization process 90 is begun. Central processing unit 48 carries out this process 90 under a control program in read only memory 51. As a part of this process 90, the supply of power to CPU 71 in display unit 40 starts a simultaneous, but unsynchronized initialization process in display unit 40, under control of a program in ROM 75. The diagnostics and initialization process 90 includes certain checks on the operating equipment and the setting of initial values for programmable registers and programmable controllers, such as CRT controllers 52 and 76, input/output ports 56, 58, 66 and 78. When initialization is completed in both units, the central processing unit 48 issues a command to the display unit 40 via ports 66 and 80 to switch multiplexer 82 into the local data processing mode, whereby display signals are supplied to monitor electronics 72 and CRT 70 by CRT controller 52, assuming all systems are in proper operation. If the diagnostics indicate a failure, a failure report is generated in process 91 of FIG. 5 and provided to the display following the operation of multiplexer switch 82.

If there is no failure, the program in ROM 51 causes CPU 48 to generate a menu message at step 92 requesting the operator to indicate by keyboard entry the operating mode the workstation is to perform The three alternatives are (1) smart terminal operation with remote data processing in a host computer (terminal mode), (2) stand-alone microcomputer operation, indicated as PC (personal computer) mode or (3) network distributed data operation. The network operation is provided by supplying an additional read only memory 55 on input/output port 59 which contains a network mode initialization program. This additional port 59 and read only memory 55 is an optional feature of the equipment, and required only to perform the network mode. If the network mode is selected, microprocessor 48 initiates a search to see if this additional ROM 55 is included in the equipment, and if the additional ROM 55 is included, the program executes a jump to the network mode program. If the ROM 55 is not included, a "mode not installed" message is displayed followed by a return to the menu presentation.

If the terminal mode is selected, CPU 48 undertakes an initialization program 95 which sends a configuration order to CPU 71 through keyboard input port 80 to set up data port 78 to an initial configuration for communications with port 56. A status inquiry is made from CPU 48 to determine the configuration set-up programmed in display unit 40 which will satisfy the host computer Microprocessor 48 configures ports 56 and 58 as required and sends commands to display unit 40 to configure port 78. Microprocessor 48 also issues a command to CPU 71 through data ports 66 and 80 which causes CPU 71 to operate multiplex switch 82 so that monitor 72 receives display signals from CRT controller 76. Microprocessor 48 also calls up the required routine to provide data connections between ports 56 and 58 and to provide translation and configuration of keyboard data supplied to keyboard input port 46 in a format at keyboard data output 66 which will satisfy the requirements of keyboard data input port 80 on display unit 40. Following these initialization steps, the computer unit 42 will operate under the terminal mode control program so that the workstation will perform the functions of a smart terminal. As required, the terminal can be caused to go into a typical terminal set-up mode operation to change the operating characteristics stored in display unit 40.

If the PC stand-alone data processing mode is selected, the CPU 48 undertakes an initialization routine 94 for this operation which includes the bootstrap loading of an operating system and, thereafter, application programs as required by the operator from disk unit 41.

After the network mode of operation is selected, if the network feature is included in the equipment, CPU 48 undertakes a program 93 in ROM 55 to initialize the network mode, and possibly, as required, to configure network port 59 so that appropriate programs and data can be down-loaded from the network host.

Activation of reset button 43 at any time during system operation will return operation to the power up, diagnostic and initialization routine 90. Simultaneous depression of the CTRL, ALT and ESC keys will return the workstation to the menu routine 92. Simultaneous depression of the CTRL, ALT and DEL keys will cause the workstation to transfer to the stand-alone PC mode initialization 94.

The display unit 40 includes firmware in ROM 75 similar to the firmware available in existing terminals, such as the Esprit II, made by the assignee of the present invention. This firmware includes a power-up, initialization and diagnostics routine which forms part of function 90 in FIG. 5. The terminal also includes a terminal set-up routine 96 for altering and storing desired terminal characteristics. These characteristics are stored in non-volatile memory, and the terminal will provide a selected set of characteristics until a new set-up mode 96 is initiated. The terminal firmware also has software for responding to a selected character sequence at keyboard input port 80 by transmitting its terminal status, including its default or operator defined RS-232c EIA port setup characteristics via input/output port 78. The terminal firmware will respond to another character sequence at port 80 by switching multiplexer switch 82 to internal video for terminal mode operation, or to external video for local data processing mode operation.

The referenced Faraday computer board is supplied with firmware in read only memory 51, including initialization logic, diagnostic testing logic, bootstrap logic, device interrupt handlers for the keyboard input 46, printer port 64, input/output ports 56, 58, floppy disk controller 60, and a programmable interval timer (not shown). These functions are included in block 90 of FIG. 5. The Faraday firmware also includes BIOS service routines for reboot and for servicing the keyboard interface 46, the CRT controller 52, the input/output ports 56, 58, printer port 64 and local floppy disk controller 60. Such firmware programs are also supplied by other microcomputer manufacturers for use with their microcomputers.

The present invention includes modifications to the Faraday firmware to provide for system operation as described. The Faraday firmware performs a processor HALT instruction upon encountering a hardware diagnostic error. This feature is changed so that for each particular error encountered either a HALT initialed bit is set in a diagnostic error byte, called the logged error byte. At the end of the diagnostic routine 90, if errors have been encountered which have set one or more bits in the logged error byte, program control is transferred to a diagnostic error reporting routine 91. Another change to the Faraday firmware is the elimination of automatic transfer of program control to the bootstrap logic at the end of the Faraday diagnostics. According to the present invention the initialization program is extended to provide further initialization in function 90 of FIG. 5 to set up the configuration of the computer unit and display unit with their interfaces. Error reporting program 91 is provided to report the results of diagnostic tests as recorded in the logged error byte. Additional software is provided in the system of the present invention to provide the menu selection operation 92 shown in FIG. 5. Depending on the operator's input during the menu selection operation, the program proceeds to one of three initialization programs to initialize the workstation into the network mode, which is function 93 in FIG. 5, the personal computer mode, which is function 94 in FIG. 5, or the terminal mode, which is function 95 in FIG. 5.

The extended initialization process provided for in the software of the present invention is added on to the Faraday initialization and hardware diagnostic procedures. This initialization includes a setting up of the keyboard output port 66 by central processor 48 to operate at 1200 baud, 8 bits per character, even parity and one stop bit. This initializes parallel to serial converter 66 to emulate the standard keyboard used with display unit 40 to configure a standard terminal.

The next routine in the initialization is to set up input/output port 56 to operate at 9600 baud, 7 bits per character, even parity and one stop bit, to interface with input/output port 78 on display unit 40. The program then causes CPU 48 to send a workstation initialization sequence through the keyboard output 66 to the keyboard input 80 of the display unit 40 giving the display unit parameters which cause the terminal to match its input/output port 78 to the parameters which have been set for input/output port 56 on computer unit 42. The program then sends a message to display unit 40 through keyboard ports 66 and 80 causing the display unit to send status. The display unit 40 provides the response to the computer unit 42 by input/output ports 78 and 56. If the response from the display is not received for a selected time interval the computer unit repeats the instructions for initializing input/output port 78 to the display unit through the keyboard output 66 and repeats the command to send status. After three attempts to setup communications without an appropriate response from the display unit an initialization failure is logged in the logged error byte.

If a correct response is received from the display unit 40, the computer unit 42 extracts from the just received response the setup parameters for the terminal input/output port which may have been selected through previous operation of terminal setup routine 96. When these terminal port characteristics have been obtained, the routine again repeats the setup procedures for input/output ports 56 and 78 using the input/output port parameters which have been previously setup in the display unit. Following completion of the initialization process, the program reviews the setting of the logged error byte to see if there were any initialization failures. This is also done if initialization cannot be completed because of a failure to setup communications between the computer unit and the display unit. If failures existed, the computer unit will attempt to switch the terminal video by sending the appropriate command through keyboard ports 66 and 80. The display is cleared and diagnostic error messages are displayed using a display formatting subroutine included in the firmware. Only those error messages which correspond to failures indicated by set bits in the logged error byte will be displayed. Following the error display subroutine 91, the system will execute a HALT.

If no bits in the logged error byte have been set, indicating that initialization has been successfully completed, the program control is transferred to the menu operation 92. This operation can also be manually initiated by simultaneous depression of the keys CTRL, ALT and ESC. The menu operation 92 displays a menu on the monitor, using the formatting subroutine, which prompts the operator to enter numeric values 1, 2 or 3 to select stand-alone PC operating mode, terminal mode or network mode, respectively. This menu operation remains in control until a valid entry is made, following which control will pass to one of the modules for initialization of PC operation 94, terminal operation 95 or network operation 93 according to the entry. The menu operation 92 includes a command to switch the terminal video switch 82 to external input. A special keyboard interrupt by-pass switch is operated, so that the CTRL, ALT, DEL and CTRL, ALT, ESC sequences are ignored during menu operation. The display is cleared, and using the formatting subroutine the text portion of the monitor menu is displayed. The unit awaits, accepts and echoes the next single character entry using a keyboard input subroutine. If the entry character is a 1, 2 or 3, control is transferred to the appropriate initialization program. If the entry character is any other character, an error message is posted which requests the operator to re-enter a selection and the cursor is placed over the original entry.

If stand-alone PC mode has been selected, the PC initialization program 94 is implemented. This program can also be directly entered by simultaneous operation of the keys CTRL, ALT and DEL. This program will be exited if there is no local floppy disk unit 41 from which to boot an operating system. The program will also be exited by simultaneous depression of the CTRL, ALT and ESC keys, which will transfer program control to menu operation 92. The PC initialization firmware first checks for the existence of a local floppy unit 41. If no drives are operable, an error message is posted using the formatting subroutine and control is transferred into the menu operation with a display of a prompt message requesting the selection of an operating mode. The keyboard interrupt is set so that sequences CTRL, ALT and DEL and CTRL, ALT and ESC are not ignored. A command is sent to display unit 40 via keyboard ports 66 and 80 to switch multiplexer switch 82 to external video input. Using a special flag, checked by the interrupt handler in ROM 51 for input/output port 56, communications by this port to the display unit are disabled. The display is cleared and the program attempts to boot an operating system from the local floppy unit 41 until successful or until simultaneous depression of CTRL, ALT and ESC keys are detected by the keyboard interrupt handlers. This keyboard operation returns control to the menu operation 92. The booted operating system, usually the MS-DOS operating system, will thereafter maintain control of the computer until either the keyboard command to return to the menu operation 92, or the CTRL, ALT, DEL keyboard command, which will attempt to reboot the operating system.

When the terminal mode is selected the terminal mode initializing routine 95 configures input/output ports 56 and 58 in accordance with characteristics previously established for input/output port 78 and provides programs which replace the standard BIOS keyboard 46, input/output port 56 and 58 interrupt handlers with substitute handlers until the terminal mode is exited. The input/output ports 56 and 58 are interrupt driven. The substituted handlers will receive and buffer incoming data. Part of the program will check the buffers for any data, and output the data to the keyboard output parallel to serial converter 66, or the input/output ports 56, 58 as appropriate. Seven bit data and eight bit data will be handled differently with respect to the transmission of parity, to enable the propagation of received parity errors with 7 bit data received with parity being transmitted as 8 bit data without parity and 8 bit data received with parity being transmitted as 8 bit data with parity with the parity reversed if an incoming parity error is detected for that character. Input/output port 56 and 58 signalling will be maintained separately as required to exchange data on each port. If the communications flow is stopped on one port, then this event will be signaled to the handlers for the other port and communications will also be stopped there. Special provisions exist to intercept operator initiated setup changes and to automatically implement any changes to the configuration of input/output ports 56 and 58 and command the display unit 40 via keyboard output 66 to keyboard input 80 to configure input/output 78 similarly.

The network initialization program 93 is initiated when network operation is selected by an operator. This operation is under the control of a custom program on a special ROM 55, usually provided in connection with high-speed interface 59 for network operation. When network mode is selected, ROM 51 includes instructions to cause CPU 48 to check for a valid pattern in the memory address corresponding to ROM 55. If this pattern is not detected, which indicates that ROM 55 has not been installed, the program generates a message indicating that network mode operation is not available, after a delay, the message is replaced by a prompt for a new menu mode selection. If the ROM address has the correct pattern, the program verifies the check sum of network ROM 55 and then transfers control to byte 3 of the network ROM for further initialization, and operation. If the check sum is not correct, the system also indicates that network mode is not available. The network initialization ROM 55 will usually contain a custom initialization program configured for the particular network.

The display formatting subroutine, which is used at various points in the firmware, accepts a string of characters terminated by a 0 and outputs each character in the string to the display, beginning with the current screen cursor position. Following each character output, the screen cursor is advanced. At the end of a line, or the end of the screen, the cursor will be positioned to the first character of the next line or of the screen respectively. This software can also respond to commands to clear the screen, set attributes, position the display cursor, or write a series of characters to form graphics on the display.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

We claim:

1. A workstation for performing both local and remote data processing, comprising:
    a display unit, having a first display memory, a first display control circuit, a display monitor, a data communications port and a first keyboard input port, said display unit being responsive to displayable data designating signals supplied to said data communications port with a first data format and said keyboard input port with a first keyboard format for storing said data in said first display memory, and said first display control circuit being responsive to said data in said first display memory for generating first display signals with signal format for operating said display monitor;
    a computer unit including a central processor unit, a second display memory, a second display control circuit, a second keyboard input port, at least first and second data communications ports, a keyboard output port and a control program for controlling said central processing unit, said keyboard output port connected to said first keyboard input port of said display unit for supplying signals including said displayable data designating signals thereto said first data communications port being connected to said data communications port of said display unit for exchange of signals including said displayable data designating signals therewith, said control program including a terminal mode control program for operating said central processing unit to couple data including said displayable data supplied to said second keyboard input port by a keyboard with second keyboard format to said keyboard output port with said first keyboard format at said keyboard outport port and to couple data including said displayable data between said first and second data communications ports with said first data format at said first data communications port and second data format at said second communications port compatible with a remote data source, said control program including a local display program for causing said central processing unit to supply data to said second display memory and to cause said second display control circuit to respond to data in said second display memory for generating second display signals with said signal format for operating said display monitor;
    and a display signal switch coupled to said first and second display circuits and said monitor for supplying said first display signals to said display monitor when said central processing unit operates under said terminal mode control program and for supplying said second display signals to said display monitor when said central processing unit operates under said local display program.

2. A workstation as specified in claim 1 wherein said display signal switch is connected to said first display control circuit, and wherein said first display control circuit is arranged to generate a switch control signal in response to command signals from said central processing unit.

3. A workstation as specified in claim 1 wherein said second display control circuit includes a display data bus for coupling data from said central processing unit to said second display memory, and wherein said keyboard data output port is coupled to said display data bus for receiving said keyboard data from said central processing unit.

4. A workstation as specified in claim 3 wherein said keyboard data output port comprises a parallel to serial data converter.

* * * * *

UNITED STATES PATENT AND TRADEMARK OFFICE
CERTIFICATE OF CORRECTION

PATENT NO. : 4,665,501
DATED : May 12, 1987
INVENTOR(S) : Neil P. Saldin, et al.

It is certified that error appears in the above-identified patent and that said Letters Patent is hereby corrected as shown below:

Col. 1, line 6, after "invention" insert --relates.

Col. 4, line 16, "and the" should read -- . The--.

Col. 5, line 64, "micromputer" should read --computer--.

Col. 11, lines 65-66, "initialed bit" should read --is initiated or a bit--.

Col. 14, line 10, "the" (second occurrence) should read --these--.

Col. 15, line 38, "outport" should read --output--.

Signed and Sealed this

Twenty-third Day of August, 1988

Attest:

DONALD J. QUIGG

*Attesting Officer*   *Commissioner of Patents and Trademarks*